Figure 1:
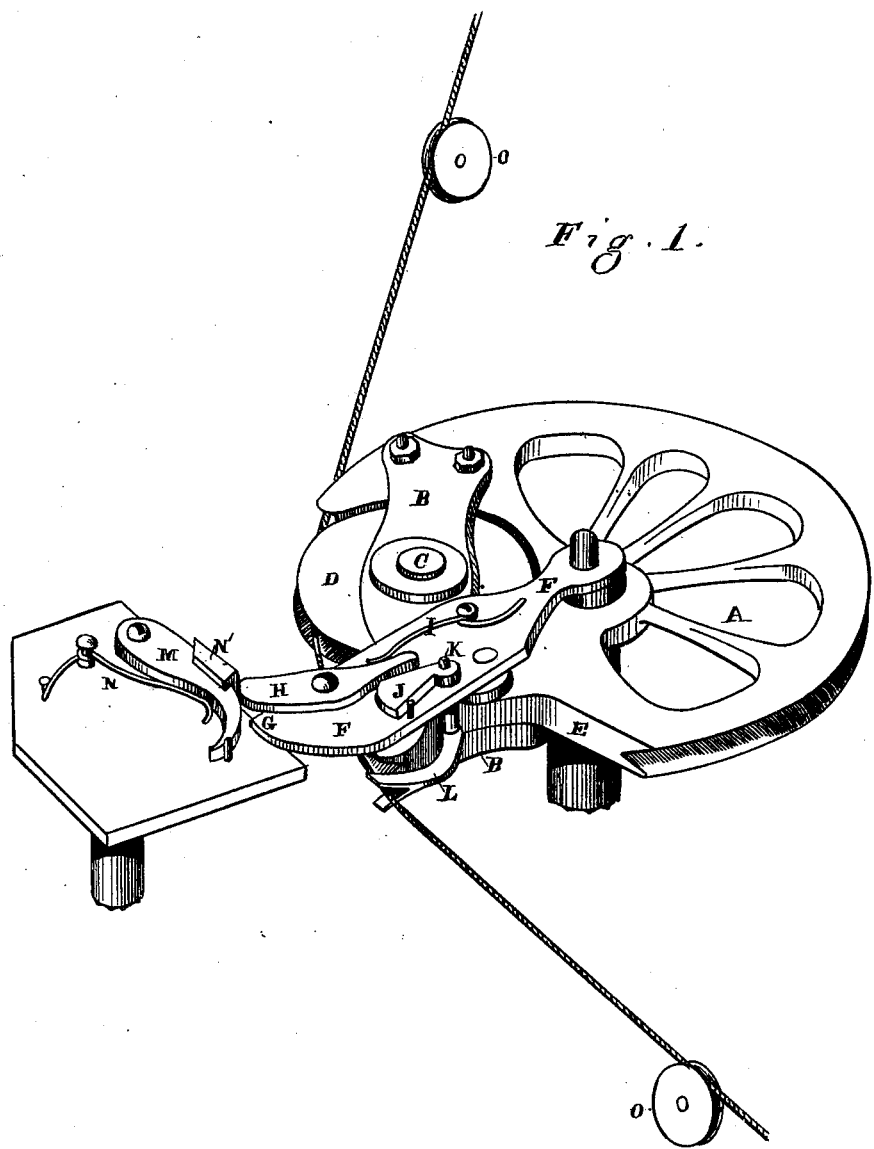

2 Sheets—Sheet 2.

A. BLATCHLY.
Wire Rope Way.

No. 206,700.          Patented Aug. 6, 1878.

Witnesses
Geo. H. Strong
Frank A. Brooks

Inventor
Ambrose Blatchly
by Dewey & Co.
Atty

UNITED STATES PATENT OFFICE.

AMBROSE BLATCHLY, OF KERNVILLE, CALIFORNIA.

IMPROVEMENT IN WIRE-ROPE WAYS.

Specification forming part of Letters Patent No. 206,700, dated August 6, 1878; application filed June 7, 1878.

*To all whom it may concern:*

Be it known that I, AMBROSE BLATCHLY, of Kernville, county of Kern, and State of California, have invented an Improvement in Wire-Rope Ways and Tramways; and I do hereby declare the following to be a full, clear, and exact description thereof, reference being had to the accompanying drawings.

My invention relates to improvements in wire-rope tramways by which the direction of the rope may be changed from a straight line without the buckets, clutches, or other objects attached to the rope being broken or interfering with the action of the pulley.

It consists in mounting a grooved pulley so as to revolve in a horizontal plane, and placing on it a supplemental pulley, the edge of which is in line with the periphery of the main pulley. Over this I secure a plate so constructed as to engage with a catch at a certain point and stop the revolution of the main pulley, so that the friction of the cable is taken on the small supplemental pulley, which revolves as the main pulley is stopped by the plate engaging with the lug. Back of this plate I cut in the edge of the main pulley a peculiarly-shaped slot into which projects a forked arm of a bell-crank lever operating a cam on top of the plate in such a manner that when a bucket, clutch, or other obstacle on the cable catches in the forked arm of the bell-crank lever said lever operates the cam, so as to press back the catch and allow the main pulley to revolve. The bucket or clutch then hangs in the slot as the main pulley is revolved, not coming in contact with it, so that it passes by without interference. After it passes, the main pulley revolves until the plate engages with the lug, when the rope plays on the supplemental pulley until the next projection or attachment on the cable operates the device as before.

In wire-rope ways and tramways great difficulty has always been found in changing the direction of the rope from a straight line, and various devices have been attempted to overcome the difficulty. On ropeways where buckets are attached to the cable, which have to pass around the main pulleys at the ends, devices have been used which are attached to each separate bucket, adding weight, increasing friction and expense and liability of breakage. On tramways where clutches or gripes are attached to the cable from the car or dummy above, it has been necessary to detach the gripe or clutch from the cable altogether when the direction of the rope has been changed from a straight line, no practical method having been found of getting the gripes past the horizontal pulleys necessary to change the direction of the cable.

My invention is intended to obviate these difficulties and change the direction of a line of cable at right angles, if necessary, without having to detach gripes, clutches, or buckets, or without separate attachments being added to the gripes or buckets, the whole object being accomplished by the peculiar construction and operation of the pulleys at the ends or corners of the lines.

Figure 2:
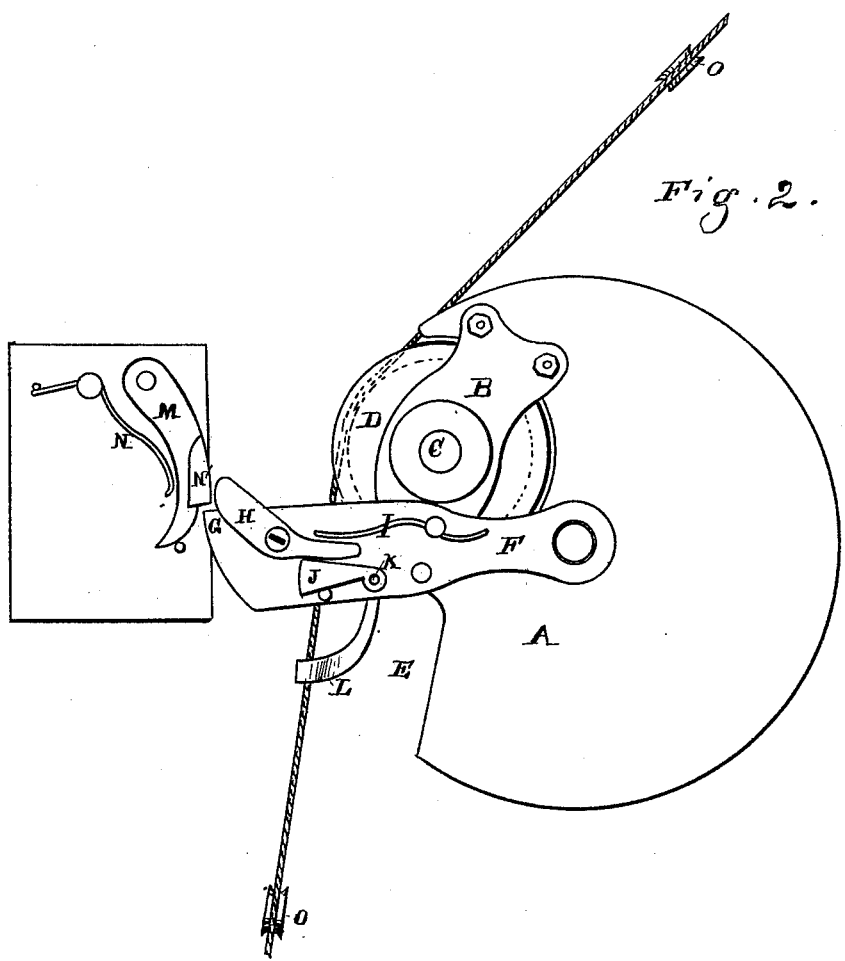

In the accompanying drawings, Figure 1 is a perspective view of my device. Fig. 2 is a top view of the same.

Let A represent a grooved pulley mounted on a vertical shaft, so as to have a horizontal revolving motion. A certain portion of this horizontal pulley is cut away in a circular shape; as shown, and across this recess extends two arms, B, one above and one below, secured to the main pulley by means of bolts and nuts. Vertically through the center of these arms passes a shaft or pin, C, on which is mounted, between the arms, a supplemental grooved pulley, D, which also revolves on a horizontal plane.

In the main pulley, back of the supplemental pulley, is formed a slot, E, in a peculiar shape, as shown, for the purpose hereinafter described.

On top of the main pulley A is secured a metal plate, F, which extends over the periphery of the main pulley, the outer point, G, of said plate being squared, as shown. On top of this plate is swiveled a cam, H, having a spring, weight, or other operating device, I, which keeps its inner end against the upper arm, J, of a bell-crank lever formed of said upper arm J, pin K, and forked arm L, the latter being on the under side of the plate F and extending out into the peculiarly-shaped slot E, as shown.

Mounted on a suitable standard in the proper position, opposite the main pulley A and on a level with it, is pivoted a catch, M, with a spring, N, on its outer side, as shown. On top of this catch M is a lug, N', which projects out past the inner edge of said catch, and this projection is continued down to the lower edge of the catch, as shown, so that the square end G of the plate F will engage with the lug, for the purpose hereinafter described.

The operation of my device is as follows: The cable passes around two pulleys (represented by O) freely through the fork on the end of the lever-arm L and around one edge of the grooved supplemental pulley D. The pulley D revolves independently of the large pulley A, which latter is held stationary by the pointed end of the plate F being engaged with the lug N' on the catch M. Now, when a bucket or clutch, or anything else, which may be attached to the main cable has to pass by, as soon as it reaches the forked end of the lever-arm it strikes against the forked end and presses the lever-arm in the direction of its motion. This operates the upper arm, J, by its pin K being connected to the forked arm, as shown. As this upper arm J, with its rounded edge, strikes against the edge of the cam H, the outer edge of said cam presses against the upper part of the projection N' on the catch M, thus pressing the catch M back against its spring N and disengaging the squared end G of the plate F from the lug N'.

The large pulley A is then free to rotate on its axle, and as it is rotated by the friction of the cable in the groove on its edge, the bucket, clutch, or other object attached to the cable, hangs by the cable in the slot E, and does not come in contact with the pulley A at all the forked lever-arm L holding the rope and bucket or clutch in the proper position un-until they have swung the main pulley. The pulley A continues to rotate until the pointed end G of the plate F again engages with the lug N' on the catch M, when its motion is stopped, the cable or rope then simply rotating the supplemental pulley D. This action is repeated as often as a bucket, clutch, or other obstacle on the rope or cable actuates the lever-arm L, as herein described, the springs throwing the catch, cam, and bell-crank arms into position each time, ready for action.

By this means I provide a device by which the direction of cables or tramways may be changed to any angle desired without the buckets, clutches, or other objects attached to the ropes coming in contact with the pulley which changes the direction, or without their being liable to breakage or throwing the cable out of the groove in the pulley. The whole action is automatic, no attendance being required.

As the cable moves along it passes through the fork on the end of the lever without touching it, unless one of the attachments on the cable strikes the forked end of the lever, when the device is operated as described.

Having thus described my invention, what I claim as new, and desire to secure by Letters Patent, is—

1. The large directing-pulley A, mounted so as to rotate upon its axis when required, and having its edge slotted or notched at E to admit the clutch, bucket, or other attachment to the cable without its coming in contact with the edge of the wheel, substantially as herein described.

2. The directing-pulley A, recessed to receive the supplemental anti-friction pulley D, mounted to rotate within the recess in the main pulley, and independent of its motion, substantially as herein described.

3. The plate F, secured to and projecting beyond the periphery of the pulley A, so that the point G will engage the movable lug N' and prevent the rotation of the pulley A except when desired, substantially as herein described.

4. The cam H, and the arm J, having the forked lever-arm L extending into the notch E, so that any attachment or projection upon the moving cable shall operate the levers and cam and disengage the point G from the lug N' and allow the large pulley A to rotate, substantially as shown, and for the purpose herein described.

5. The large grooved pulley A, with supplemental grooved pulley D mounted in its periphery, so that their grooves shall be in the same plane, in combination with the plate F, spring-holding catch M, with its lug N', and the disengaging-cam H, arm J, and notched lever-arm L, fitted to be actuated by any projection from the passing cable, substantially as herein described.

In witness whereof I hereunto set my hand and seal.

AMBROSE BLATCHLY. [L. S.]

Witnesses:
GEO. H. STRONG,
FRANK A. BROOKS.